(12) United States Patent
Kitadani

(10) Patent No.: US 8,779,671 B2
(45) Date of Patent: Jul. 15, 2014

(54) ILLUMINATION DEVICE

(75) Inventor: Kazuma Kitadani, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 13/274,747

(22) Filed: Oct. 17, 2011

(65) Prior Publication Data

US 2012/0098449 A1 Apr. 26, 2012

(30) Foreign Application Priority Data

Oct. 22, 2010 (JP) .................................. 2010-237160
Jun. 17, 2011 (JP) .................................. 2011-134862

(51) Int. Cl.
*G09G 3/12* (2006.01)

(52) U.S. Cl.
USPC ...................... 315/160; 315/169.3; 315/169.2

(58) Field of Classification Search
CPC ......... H05B 39/00; G09G 3/22; G09G 3/3233
USPC ......................................................... 315/160
See application file for complete search history.

(56) References Cited

U.S. PATENT DOCUMENTS

| | | | | |
|---|---|---|---|---|
| 2003/0132896 A1* | 7/2003 | Matsueda | ........................ | 345/55 |
| 2004/0041525 A1* | 3/2004 | Park et al. | .................. | 315/169.3 |
| 2005/0046341 A1* | 3/2005 | Ikeda et al. | .................... | 313/504 |
| 2008/0246704 A1* | 10/2008 | Kawase | ......................... | 345/80 |
| 2010/0045578 A1* | 2/2010 | Yamazaki et al. | .............. | 345/76 |

FOREIGN PATENT DOCUMENTS

| | | | |
|---|---|---|---|
| JP | 2007026932 A | * | 2/2007 |
| JP | A-2007-026932 | | 2/2007 |
| JP | A-2007-080770 | | 3/2011 |

* cited by examiner

*Primary Examiner* — Douglas W Owens
*Assistant Examiner* — Monica C King
(74) *Attorney, Agent, or Firm* — Oliff PLC

(57) ABSTRACT

An illumination device includes an organic EL panel having a light emission layer provided between a first electrode and a second electrode, a power source, a power switcher, a control circuit, and a plurality of power supply portions connected to the first electrode. The control circuit controls the power switcher in such a way that, when a first power supply portion of the plurality of power supply portions is connected to the power source, a second power supply portion is not connected to the power source. The power supply portions that supply power to the first electrode are switched sequentially at a high speed. Therefore, a user will feel as if the illumination device emits light without any unevenness of brightness two-dimensionally.

7 Claims, 6 Drawing Sheets

ILLUMINATION DEVICE

BACKGROUND

1. Technical Field

The present invention relates to an illumination device such as an organic EL illumination device for use as a backlight or the like.

2. Related Art

These days, a light emission device (illumination device) that is provided with organic EL elements is used as a backlight for a liquid crystal display screen of lighting fixture, electronic information equipment, and the like. Since a light emission device that is provided with organic EL elements is self-luminous, it offers a wide angle of view and excellent visibility. In addition, since the element is a thin-film perfect solid-state component, space-saving design can be achieved. Because of these features, it is attracting attention from the industry as a light emission source. An example of such a light emission device is disclosed in JP-A-2007-26932.

In an organic EL light emission device according to related art, unevenness of brightness occurs as a difference between the brightness of a light emission area near a power-receiving part of a positive electrode and the brightness of a light emission area away from the power-receiving part. This is because, since the resistance of a transparent electrode layer used for the positive electrode is large, a voltage drop is relatively large at an area that is relatively distant from the positive-electrode-side power-receiving part, which causes a decrease in light-emission brightness. To address such a problem, a technique of supplying power to a positive electrode from a plurality of power-receiving parts via auxiliary wiring is disclosed in JP-A-2007-26932.

However, a light emission device disclosed in JP-A-2007-26932 has the following disadvantages. Since positive electrode auxiliary wiring is provided over a positive electrode in an organic EL light emission area and the periphery of the organic EL light emission area, the layout of the positive electrode and the positive electrode auxiliary wiring is complex, resulting in a decrease in productivity. Material cost increases for forming a metal electrode layer. Energy inputted to a deposition apparatus at the time of manufacturing increases. Another production inefficiency is longer manufacturing time. In other words, it is difficult to achieve both uniform light emission throughout the entire light emission area and high efficiency in the manufacturing of an organic EL illumination device.

SUMMARY

To provide a solution to at least a part of the above problems without any limitation thereto, the invention provides, as various aspects thereof, an illumination device including the constituent elements and having the features stated in Application Examples below, specific examples of which are described in detail in DESCRIPTION OF EXEMPLARY EMBODIMENTS.

Application Example 1

An illumination device according to a first aspect of the invention includes: a first electrode; a second electrode; a light emission layer that is provided between the first electrode and the second electrode; a power source; a power switcher; a control circuit; and a plurality of power supply portions that is connected to the first electrode, wherein the control circuit controls the power switcher in such a way that, when a first power supply portion of the plurality of power supply portions is connected to the power source, a second power supply portion is not connected to the power source. When the first electrode is a transparent conductive film, because a transparent conductive film has a comparatively high specific resistance, light-emission brightness is relatively high in the neighborhood of a power supply portion. Light-emission brightness is relatively low at an area that is relatively distant from the power supply portion. With the above structure, it is possible to switch power supply portions that supply power to the first electrode sequentially. If the power supply portions are switched at a speed that is high enough so that a user cannot perceive it visually, the user will feel as if the illumination device emits light without any unevenness of brightness two-dimensionally. This means that the illumination device can suppress unevenness of brightness with a simple structure without any need to provide a positive electrode auxiliary line or any similar special component. In other words, it is possible to achieve both uniform light emission throughout the entire light emission area and high efficiency in the manufacturing of an organic EL illumination device at low cost.

Application Example 2

In an illumination device according to the above application example, it is preferable that the power switcher should include a plurality of switches that is connected to the plurality of power supply portions. With such a preferred structure, it is possible to select a power supply portion just by providing the switches corresponding to the power supply portions. Thus, it is possible to achieve both uniform light emission throughout the entire light emission area and high efficiency in the manufacturing of an organic EL illumination device at low cost without complicating a structure.

Application Example 3

In an illumination device according to above application example, it is preferable that the control circuit should put the plurality of switches into an ON state selectively. To turn on a switch, a clock signal or the like is supplied to the input terminal of the switch. With such a preferred structure, it is possible to select the power supply portions sequentially just by supplying a plurality of phase-shifted clock signals to the switches, which is simple.

Application Example 4

In an illumination device according to the above application example, it is preferable that the power switcher should include an inverter circuit. With such a preferred structure, it is possible to prepare, from DC power, AC power with a phase difference by using a very small clock signal from a controller. Therefore, it is possible to supply predetermined power to the power supply portions sequentially.

Application Example 5

In an illumination device according to the above application example, it is preferable that the plurality of power supply portions should include the first power supply portion and the second power supply portion; the first power supply portion should be provided along a first side of the first electrode; the second power supply portion should be provided along a second side of the first electrode; and the first power supply portion and the second power supply portion should get connected to the power source alternately. In such a preferred structure, since the first power supply portion and the second power supply portion supply power to the first electrode alternately, the area where light-emission brightness is high is switched between the neighborhood of the first power supply portion and the neighborhood of the second power supply portion. Therefore, light-emission brightness perceived by a user visually on average timewise is equalized.

Application Example 6

In an illumination device according to the above application example, it is preferable that the first electrode should have a polygonal shape; and the first side and the second side should be located opposite to each other. In such a preferred structure, the area where light-emission brightness is high is switched between the neighborhood of the first power supply portion and the neighborhood of the second power supply portion. In addition, the first side and the second side are located opposite to each other. Therefore, light-emission brightness on average timewise is equalized in terms of space.

Application Example 7

An illumination device according to a second aspect of the invention includes: a first electrode; a second electrode; a light emission layer that is provided between the first electrode and the second electrode; a first switch that is connected to a first side of the first electrode; a second switch that is connected to a second side of the first electrode, the second side being located opposite to the first side; and a control circuit that is connected to the first switch and the second switch and carries out control to put the first switch and the second switch into an ON state alternately. In such a structure, power is supplied from the first side to which a positive electrode (first electrode) is connected and the second side, which is located opposite to the first side, alternately. The light emission layer, which is provided between the positive electrode and a negative electrode (second electrode), emits light. When power is supplied to either the first side or the second side, unevenness of brightness occurs because of a voltage drop caused by a resistance in positive electrode wiring. However, if the first switch, the second switch, and the control circuit controlling them are used to set the cycle of alternate power supply through a positive electrode connected to the first/second side at a frequency that is high enough so that such fast switching therebetween is not perceptible to the human eye, it is possible to make unevenness of brightness inconspicuous. Moreover, it is possible to provide an illumination device that offers manufacturing advantages without any need to adopt complex layout or auxiliary wiring.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
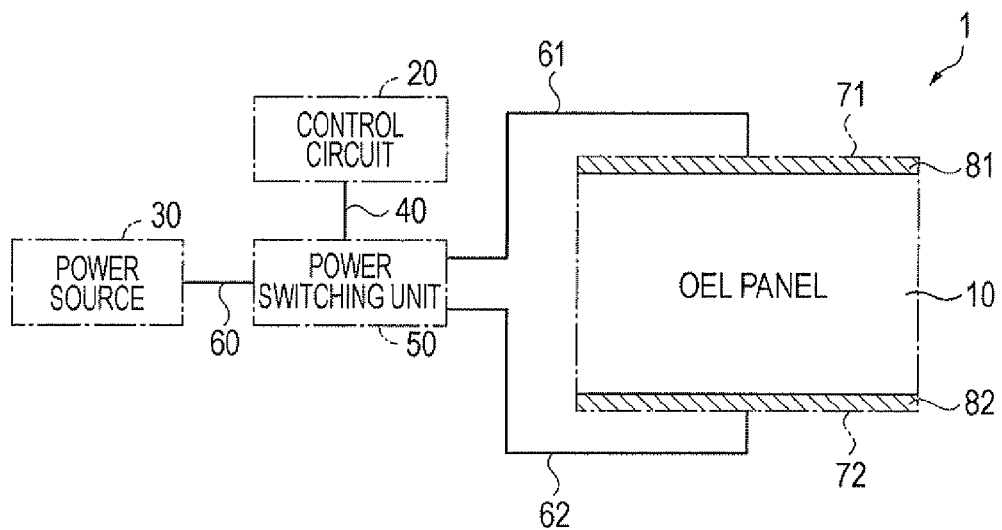
FIG. 1 is a block diagram that schematically illustrates an example of the functional blocks of an illumination device according to a first embodiment of the invention.

With reference to the accompanying drawings, exemplary embodiments of the present invention will now be explained in detail. In the drawings that are referred to in the following description, scales different from actual dimensions are used for layers/members illustrated therein so as to make each of them easily recognizable.

First Embodiment

Overview of Illumination Device

Figure 2:
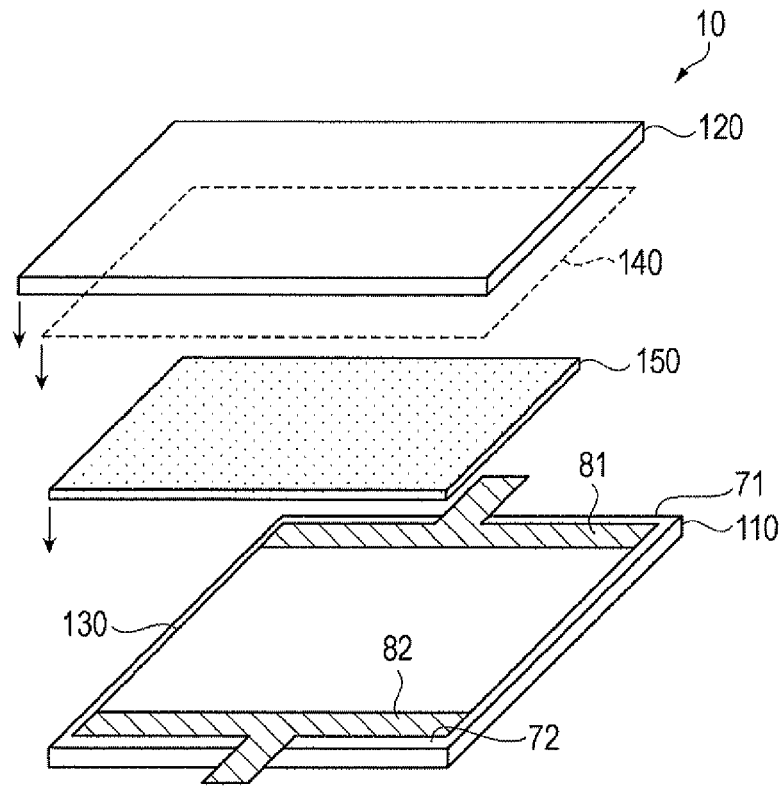
FIG. 2 is a perspective view that schematically illustrates an example of the layer structure of an illumination device according to the first embodiment of the invention.

First of all, the overall structure (overview) of an illumination device according to a first embodiment of the invention is explained with reference to FIG. 1. FIG. 1 is a block diagram that schematically illustrates an example of the functional blocks of an illumination device according to the present embodiment of the invention. An illumination device 1 according to the present embodiment of the invention includes an organic EL panel 10, a control circuit 20, a power source 30, and a power switching unit 50. As illustrated in FIG. 2, the organic EL panel 10 includes a first electrode 130, a second electrode 140, and a light emission layer 150 provided between the first electrode 130 and the second electrode 140. In this example, the first electrode 130 is a transparent conductive film serving as a positive electrode. The second electrode 140 is a metal film serving as a negative electrode. Referring back to FIG. 1, the overall structure of the illumination device 1 is further explained. A plurality of power supply portions is provided on the first electrode 130. Specifically, the plurality of power supply portions includes a first power supply portion 81 and a second power supply portion 82. The first power supply portion 81 is provided along a first side 71 of the first electrode 130. The second power supply portion 82 is provided along a second side 72 of the first electrode 130. The first side 71 and the second side 72 are located opposite to each other. The term "sides that are located opposite to each other" means two sides that are parallel to, or substantially parallel to, each other among the sides of a polygon. In the present embodiment of the invention, the top edge of the organic EL panel 10, which has a rectangular shape, corresponds to the first side 71. The bottom edge thereof, that is, a side that is substantially parallel to the first side 71, corresponds to the second side 72. The control circuit 20 controls the power switching unit 50 in such a way as to selectively and non-concurrently connect the plurality of power supply portions to the power source.

The power switching unit 50 and the power source 30 are connected to each other via a power line 60. The power switching unit 50 and the control circuit 20 are connected to each other via a control line 40. The power switching unit 50 and the first power supply portion 81 are connected to each other via a first power line 61. The power switching unit 50 and the second power supply portion 82 are connected to each other via a second power line 62. A control signal is sent from the control circuit 20 to the power switching unit 50 via the line 40. On the basis of the control signal, the power switching unit 50 connects the power source 30 to either the first power supply portion 81 or the second power supply portion 82. Consequently, the first power supply portion 81 and the second power supply portion 82 get connected to the power source 30 alternately. That is, during a period of time in which the first power supply portion 81 is connected to the power source 30, the second power supply portion 82 is not connected to the power source 30. During a period of time in which the second power supply portion 82 is connected to the power source 30, the first power supply portion 81 is not connected to the power source 30. The cycle of the alternate connection of the first power supply portion 81 and the second power supply portion 82 to the power source 30 is set at a frequency that is high enough so that such fast switching therebetween is not perceptible to the human eye. A preferred example of the cycle is 60 Hz or an integer multiple thereof.

The first electrode 130 is a transparent conductive film that has a comparatively high specific resistance. Therefore, "area-dependent" differences in brightness (unevenness of brightness) arise on the organic EL panel 10 to some degree or another. Specifically, brightness is relatively high at an area near a power supply portion. Brightness is relatively low at an area away from a power supply portion. In the present embodiment of the invention, the first power supply portion 81 and the second power supply portion 82 supply power to the first electrode 130 alternately. For this reason, the area where light-emission brightness is high is switched between the neighborhood of the first power supply portion 81 (the neighborhood of the first side 71) and the neighborhood of the second power supply portion 82 (the neighborhood of the second side 72) at a high speed. In addition, the first side 71 and the second side 72 are located opposite to each other. Therefore, light-emission brightness perceived by a user visually on average timewise is equalized throughout the entire area of the organic EL panel 10.

Structure of Illumination Device

FIG. 2 is a perspective view that schematically illustrates an example of the layer structure of an illumination device according to the present embodiment of the invention. The light emission layer 150, which is made of an organic material, is sandwiched between a first substrate 110 and a second substrate 120. The first substrate 110 is a glass substrate. The second substrate 120 is also a glass substrate. A thin film that is made of indium tin oxide (ITO) is formed as the first electrode 130 substantially on the entire surface of the first substrate 110 except for edge portions of the first substrate 110. The thickness of the layer of indium tin oxide is 100 nm. The layer of indium tin oxide is transparent and allows visible light to pass therethrough. The sheet resistance of the layer of indium tin oxide is roughly 15Ω. This transparent conductive film serves as a positive electrode for the light emission layer 150. Light emitted from the light emission layer 150 goes out from the first-substrate (110) side of the organic EL panel 10.

Since the first power supply portion 81 and the second power supply portion 82 will be formed in a later process in the neighborhood of the first side 71 of the first electrode 130 and the neighborhood of the second side 72 thereof, respectively, the light emission layer 150 is formed substantially on the entire surface except for the area of the first power supply portion 81 and the area of the second power supply portion 82. The second electrode 140 is formed on the light emission layer 150. The second electrode 140 is thin aluminum film that has a thickness of 800 nm. The sheet resistance of the second electrode 140 is approximately 40 mΩ. Since the sheet resistance of the second electrode 140 is far smaller than that of the first electrode 130, more specifically, approximately 0.3% of the sheet resistance of the first electrode 130, the fall of potential in the organic EL panel 10 occurs, for the most part, at the first electrode 130. This means that the leading cause of unevenness of light-emission brightness lies in the comparatively high sheet resistance of the first electrode 130. In order to compensate for it, in the present embodiment of the invention, the plurality of power supply portions is provided on the first electrode 130. The second substrate 120 is provided as a cover over the second electrode 140.

The first power supply portion 81 and the second power supply portion 82 are formed in the neighborhood of the first side 71 of the first electrode 130 and the neighborhood of the second side 72 thereof, respectively, These portions do not overlap the light emission layer 150. They do not overlap the second electrode 140. Nor do they overlap the second substrate 120. A copper foil that has an elongated rectangular shape is bonded to the first electrode 130 by means of either anisotropic conductive paste (ACP) or anisotropic conductive film (ACF) to form each of the first power supply portion 81 and the second power supply portion 82. The "width" (long-side length) of the copper foil is substantially equal to that of the first side 71 or the second side 72. The first side 71 of the first electrode 130 and the second side 72 thereof are covered with the copper foil in the width direction. The "length" (short-side length) of the copper foil is 3 mm. The copper foil overlaps with the first electrode 130 at its 2.5-mm part. The thickness of the copper foil is 0.1 mm. The sheet resistance of the copper foil is 0.17 mΩ. The center of the first power supply portion 81 in the width direction is connected to the first power line 61. The center of the second power supply portion 82 in the width direction is connected to the second power line 62. Therefore, even when the organic EL panel 10 has a width of 60 cm, a resistance from the center of the copper foil to an end in the width direction is 17 mΩ, which is a very small value. The resistance of anisotropic conductive paste (ACP) or anisotropic conductive film (ACF) in the thickness direction is less than 1 mΩ. Therefore, the fall of potential at the power supply portions is almost zero.

Circuit Functions and Pattern of Power Supply

Figure 3:
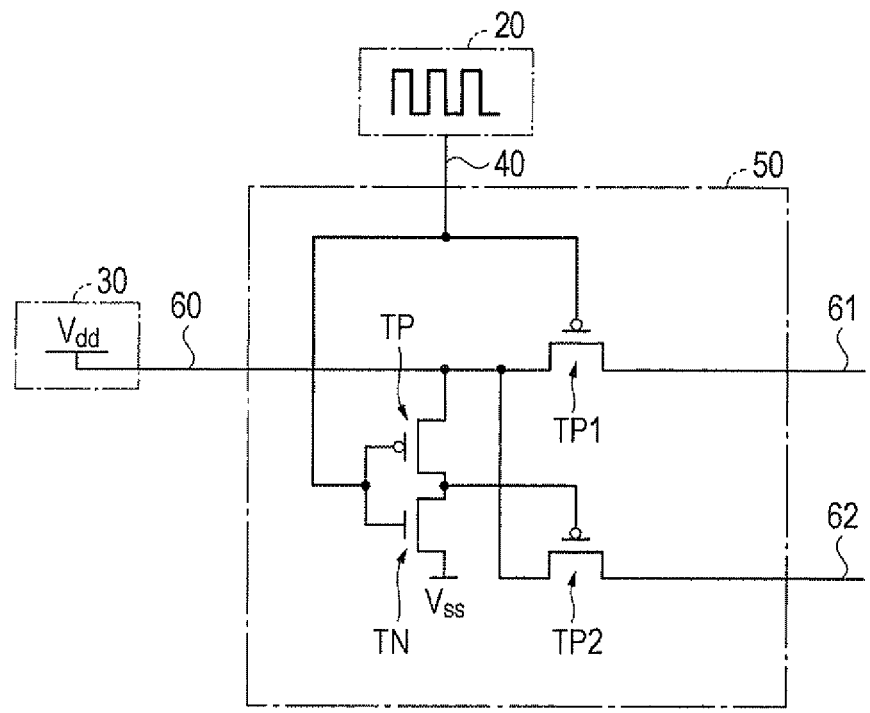
FIG. 3 is a diagram that schematically illustrates an example of the circuit functions of an illumination device according to the first embodiment of the invention.
Figure 4:
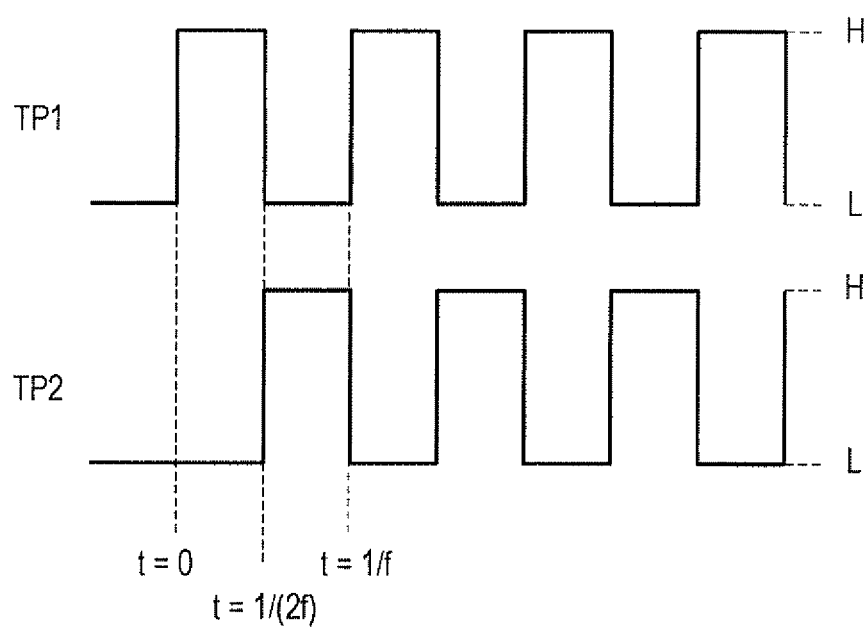
FIG. 4 is a diagram that schematically illustrates an example of a power-supply pulse pattern of an illumination device according to the first embodiment of the invention.

FIG. 3 is a diagram that schematically illustrates an example of the circuit functions of an illumination device according to the present embodiment of the invention. FIG. 4 is a diagram that schematically illustrates an example of a power-supply pulse pattern of an illumination device according to the present embodiment of the invention. With reference to these drawings, circuit functions and the pattern of power supply will now be explained. As illustrated in FIG. 3, the power switching unit 50 includes switches. Specifically, a first p-type transistor TP1 and a second p-type transistor TP2 function as the switches. The power switching unit 50 further includes an inverter circuit that is made up of a p-type transistor TP and an n-type transistor TN. The p-type transistor TP and the n-type transistor TN are arranged in series between positive supply Vdd and negative supply Vss. The source of each of the first p-type transistor TP1 and the second p-type transistor TP2 is connected to the positive supply Vdd of the power source 30 via the power line 60. The drain of the first p-type transistor TP1 is connected to the first power line 61. The drain of the second p-type transistor TP2 is connected to the second power line 62.

A rectangular wave clock signal is supplied from the control circuit 20 to the input terminal of the power switching unit 50 via the line 40. The input terminal of the power switching unit 50 is connected to the input terminal of the inverter circuit and the gate of the first p-type transistor TP1. The output terminal of the inverter circuit is connected to the gate of the second p-type transistor TP2. Since the illumination device has the circuit structure described above, the drain conductance of the first p-type transistor TP1 and the drain conductance of the second p-type transistor TP2 are complementary to each other as illustrated in FIG. 4. That is, when one of these two transistors is in a high conductance state H, the other is in a low conductance state L. When the first p-type transistor TP1 is in the high conductance state H, the potential of the first power line 61 is equal to the positive supply voltage Vdd, whereas the second p-type transistor TP2 is in the low conductance state L. When the second p-type transistor TP2 is in the high conductance state H, the potential of the second power line 62 is equal to the positive supply voltage Vdd, whereas the first p-type transistor TP1 is in the low conductance state L. The frequency f of a rectangular wave outputted from the power switching unit 50 should preferably be an integer multiple of 60 Hz. The reason why the frequency of the rectangular wave should preferably be an integer multiple of 60 Hz is that, if so, no flickering, etc. occurs when the screen of a television set is looked at under the light of the illumination device 1 according to the present embodiment of the invention because television frame frequency is an integer multiple of 60 Hz such as 60 Hz or 120 Hz. As described above, the first power supply portion 81 and the second power supply portion 82 supply power to the first electrode 130 alternately. As illustrated in FIG. 4, the sum of the drain conductance of the first p-type transistor TP1 and the drain conductance of the second p-type transistor TP2 is constant. For this reason, the brightness of the illumination device 1 as a whole is kept at a constant level. When power is supplied to the plurality of power supply portions, it is supplied in such a way as to ensure that the sum of the conductance of the switches connected to the respective power lines should be kept constant. By this means, it is possible to obtain uniform brightness of the illumination device 1 timewise, that is, in terms of time.

Electronic Equipment

The illumination device 1 can be used for lighting in home and office, etc. Besides the above use, the illumination device 1 can be used as a backlight of a liquid crystal display device or a front light of an electrophoretic display device. As another example, the illumination device 1 can be used as a flat surface source of a vein authentication device. As in the above examples, the illumination device 1 may be built in electronic equipment for which two-dimensional uniformity, in terms of time, of brightness is required.

As described above, the illumination device 1 according to the present embodiment of the invention offers the following advantages. The power supply portions that get connected to the power source 30 alternately are switched therebetween at a high speed for supplying power to the first electrode 130 with fast switching. Therefore, a user will feel as if the illumination device 1 emits light without any unevenness of brightness in terms of space (two-dimensionally). In addition, since the sum of potentials applied to the power supply portions is kept constant, the illumination device 1 emits light without any unevenness of brightness in terms of time, too. That is, the illumination device 1 can emit light uniformly throughout the entire light emission area both in terms of space and in terms of time without any need to adopt a special structure such as a positive electrode auxiliary line.

In the present embodiment of the invention, the positive electrode is the first electrode 130. However, the scope of the invention is not limited to such an exemplary structure. If the specific resistance of the negative electrode is high, the first electrode 130 may serve as the negative electrode. As another example, the exemplary structure may be modified as follows. Both of the positive electrode and the negative electrode have a structure equivalent to that of the first electrode 130. A plurality of power supply portions is provided on each of the positive electrode and the negative electrode. The selection of the power supply portions is made for each of these electrodes.

Second Embodiment

Figure 5:
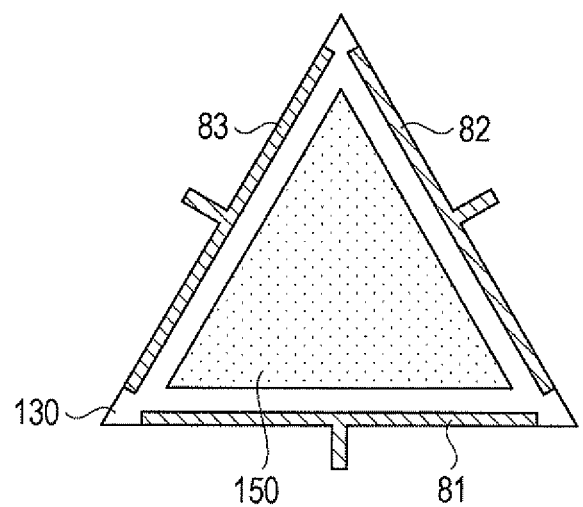
FIG. 5 is a diagram that schematically illustrates an example of a part of an illumination device according to a second embodiment of the invention.
Figure 6:
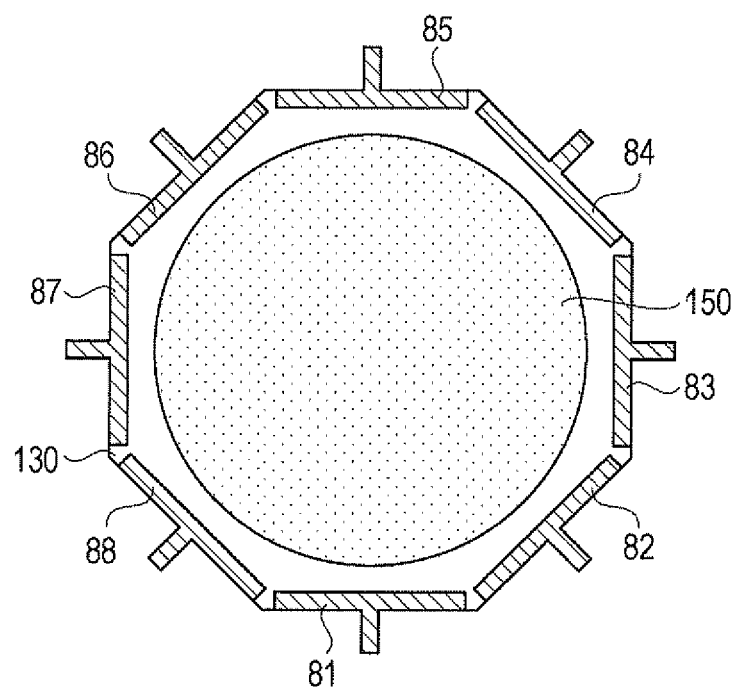
FIG. 6 is a diagram that schematically illustrates another example of a part of an illumination device according to a second embodiment of the invention.

Embodiment in which Shape of Light Emission Area is Different from that in Foregoing Embodiment FIG. 5 is a diagram that schematically illustrates an example of a part of an illumination device according to a second embodiment of the invention. FIG. 6 is a diagram that schematically illustrates another example of a part of an illumination device according to the second embodiment of the invention. An illumination device according to the present embodiment of the invention will now be explained. The same reference numerals are assigned to components that are the same as those of the first embodiment of the invention. The explanation of these components is not repeated here.

The shape of a light emission area according to the present embodiment of the invention (refer to FIGS. 5 and 6) is different from that of the first embodiment of the invention (refer to FIG. 2). Accordingly, the number of power supply portions and the layout thereof according to the present embodiment of the invention is different from that of the first embodiment of the invention. Except for the above differences, the structure of the present embodiment of the invention is substantially the same as that of the first embodiment of the invention. In the first embodiment of the invention (refer to FIG. 2), the organic EL panel 10 has a rectangular shape. Two power supply portions are provided along the top edge of the rectangular panel and the bottom edge thereof, respectively. However, the shape of the organic EL panel 10 is not limited to the foregoing example. The shape of the illumination device 1 is determined on the basis of the shape of the light emission layer 150. The shape of the light emission layer 150 is not limited to a quadrangle and can be modified into various shapes. For example, the light emission layer 150 may have a polygonal shape. An example of a triangular light emission layer is illustrated in FIG. 5. An example of a circular light emission layer is illustrated in FIG. 6.

When the shape of the light emission layer 150 is a polygon, an example of which is illustrated in FIG. 5, the shape of the first electrode 130 is a polygon that is similar to the polygonal shape of the light emission layer 150. In addition, the area of the first electrode 130 includes the area of the light emission layer 150 in a plan view. A power supply portion is provided along each side of the first electrode 130. The power supply portions get connected to the power source 30 sequentially. The sequential connection is established in a manner similar to the alternate connection in the first embodiment of the invention. Specifically, when one of the plurality of power supply portions is connected to the power source 30, the others are not connected to the power source 30. In addition, the sum of potentials applied to the power supply portions is kept constant.

In the example illustrated in FIG. 5, the shape of the light emission layer 150 is an equilateral triangle. Therefore, the shape of the first electrode 130 is also an equilateral triangle. The first power supply portion 81, the second power supply portion 82, and a third power supply portion 83 are provided along the three sides of the first electrode 130, respectively. The length of time during which each of the power supply portions is connected to the power source 30 in its turn in each cycle is: $1/(60 \times 3)$ of a second=5.6 milliseconds. The above formula can be generalized as follows. Let us assume that the number of power supply portions is N (where N is an integer greater than or equal to two). Let us assume that a cycle is $1/f$ of a second. The length of time during which each of the N power supply portions is connected to the power source 30 in its turn in each cycle is: $1/(f \times N)$ of a second. As described in detail in the first embodiment of the invention, the frequency f should preferably be an integer multiple of 60 Hz.

In the example illustrated in FIG. 6, the shape of the light emission layer 150 is a circle. The shape of the first electrode 130 is a regular octagon that is large enough to encompass the light emission layer 150. The first power supply portion 81, the second power supply portion 82, the third power supply portion 83, a fourth power supply portion 84, a fifth power supply portion 85, a sixth power supply portion 86, a seventh power supply portion 87, and an eighth power supply portion 88 are provided along the eight sides of the first electrode 130, respectively. The length of time during which each of the power supply portions is connected to the power source 30 in its turn in each cycle is: $1/(60 \times 8)$ of a second=2.1 milliseconds. The order of selection of the power supply portions can be determined arbitrarily. For example, the power supply portions may be selected in the counterclockwise order; that is, when the first power supply portion 81 is selected first, the second power supply portion 82 is selected next, followed by the selection of the third power supply portion 83. The power supply portions may be selected in the clockwise order; that is, when the first power supply portion 81 is selected first, the eighth power supply portion 88 is selected next, followed by the selection of the seventh power supply portion 87. As another example, sides that are located opposite to each other may make up each of a plurality of pairs for sequential pair selection. That is, after the selection of the two sides of a certain pair, another pair may be selected. For example, a pair of the first power supply portion 81 and the fifth power supply portion 85 is selected first. The fifth power supply portion 85 is selected after the selection of the first power supply portion 81. Then, the next pair is selected. Specifically, the third power supply portion 83 and the seventh power supply portion 87 are selected as the next pair. The seventh power supply portion 87 is selected after the selection of the third power supply portion 83. Then, the next pair is selected. Specifically, the second power supply portion 82 and the sixth power supply portion 86 are selected as the next pair. The sixth power supply portion 86 is selected after the selection of the second power supply portion 82. Then, the last pair is selected. Specifically, the fourth power supply portion 84 and the eighth power supply portion 88 are selected as the last pair. The eighth power supply portion 88 is selected after the selection of the fourth power supply portion 84. Then, the first pair is selected again.

As described above, an illumination device according to the present embodiment of the invention is capable of emitting light uniformly regardless of its shape in a plan view, in addition to producing the effects of the first embodiment of the invention.

Third Embodiment

Embodiment in which Shape of Light Emission Area is Rectangle

Figure 7:
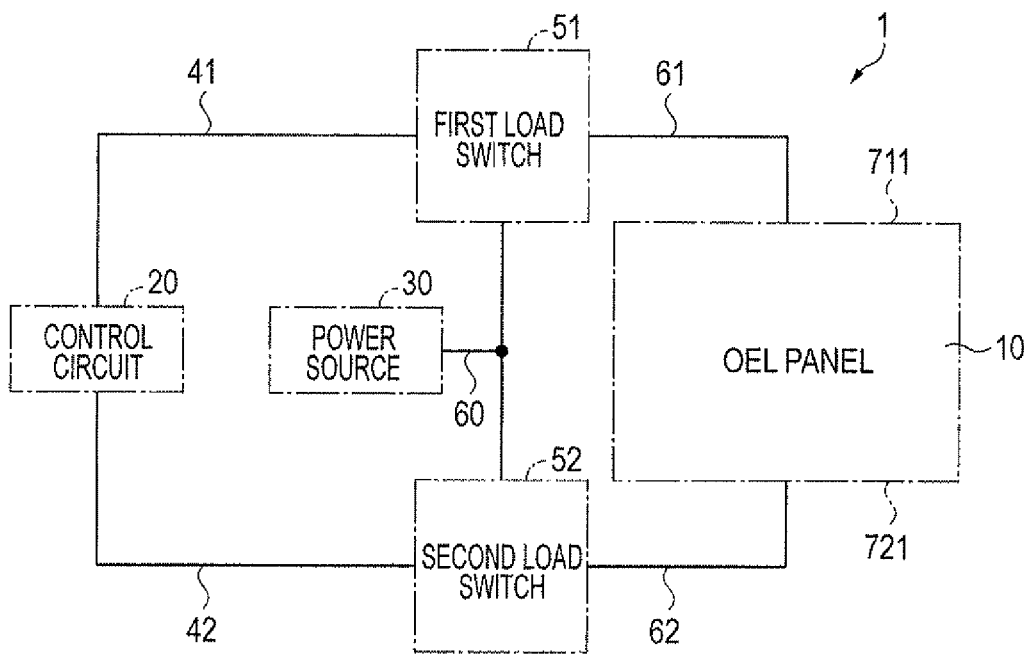
FIG. 7 is a diagram that schematically illustrates an example of the structure of an organic EL light emission device, which is an illumination device according to a third embodiment of the invention.

FIG. 7 is a diagram that schematically illustrates an example of the structure of an organic EL light emission device, which is an illumination device according to a third embodiment of the invention. An illumination device according to the present embodiment of the invention will now be explained. The same reference numerals are assigned to components that are the same as those of the first or second embodiment of the invention. The explanation of these components is not repeated here.

The difference between the present embodiment of the invention (refer to FIG. 7) and the first embodiment of the invention (refer to FIG. 3) lies in the structure of the power switching unit 50, etc. Except for the above difference, the structure of the present embodiment of the invention is substantially the same as that of the first embodiment of the invention. In the present embodiment of the invention, the power switching unit 50 is made up of a plurality of switches. Each of the plurality of switches is connected to the corresponding one of the plurality of power supply portions. There is one-to-one correspondence therebetween. The control circuit 20 can selectively set the plurality of switches into an ON state. Load switches are used as the switches.

The organic EL panel 10 includes a positive electrode (not shown) that is a first electrode, a negative electrode (not shown) that is a second electrode, and a light emission layer (not shown) that is provided between the positive electrode and the negative electrode. A part for power supply from the positive electrode of the top edge 711 of the organic EL panel 10 is formed. In addition, a part for power supply from the positive electrode of the bottom edge 721 thereof, which is opposite to the top edge 711, is formed. Power is supplied to the organic EL panel 10 through the first power line 61 and the second power line 62. The first power line 61 is connected to the positive electrode of the top edge 711 of the organic EL panel 10. The second power line 62 is connected to the positive electrode of the bottom edge 721 thereof. The first power line 61 is connected to a first load switch 51, which is one part of the power switching unit 50. The second power line 62 is connected to a second load switch 52, which is the other part of the power switching unit 50. The first load switch 51 and the second load switch 52 are connected to the power source 30 via the power line 60. The first load switch 51 is connected to the control circuit 20 via a first line 41. The second load switch 52 is connected to the control circuit 20 via a second line 42. The function of the control circuit 20, the first load switch 51, and the second load switch 52 is to switch power supply between the top edge 711 of the organic EL panel 10 and the bottom edge 721 thereof (ON, OFF), that is, whether power should be supplied therethrough or not. That is, when power is supplied through the top edge 711 of the organic EL panel 10, power is not supplied through the bottom edge 721 thereof. To put it the other way around, when power is supplied through the bottom edge 721 of the organic EL panel 10, power is not supplied through the top edge 711 thereof. The control circuit 20 switches the power supply ON/OFF at an ordinary frequency at which the human eye cannot perceive the switching therebetween. The term "ordinary frequency at which the human eye cannot perceive the switching therebetween" means 60 Hz, which is a fluorescent light frequency, the vertical frequency of a television, etc.

Figure 8:
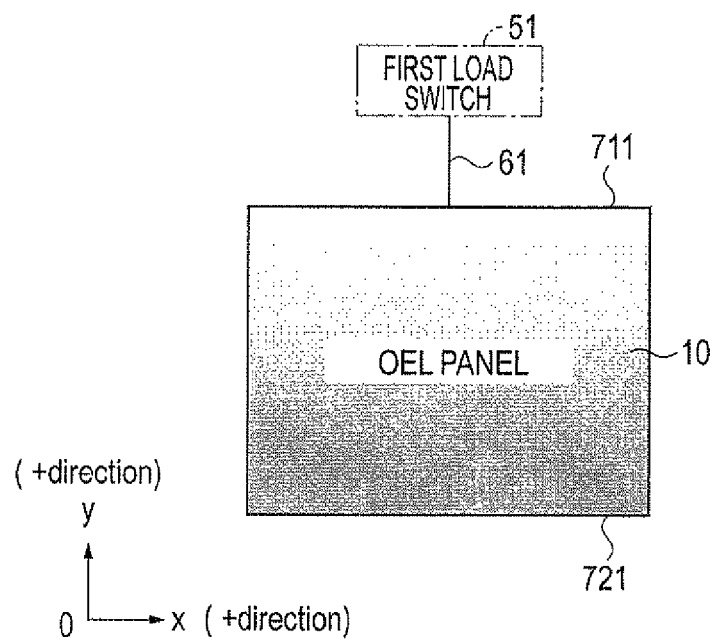
FIG. 8 is a diagram that schematically illustrates an example of power supply from a first load switch according to the third embodiment of the invention.

FIG. 8 is a diagram that schematically illustrates an example of power supply from the first load switch 51 to the top edge 711 of the organic EL panel 10.

When power is supplied from the first load switch 51, which is one part of the power switching unit 50, to the top edge 711 of the organic EL panel 10 via the first power line 61, a brightness gradient (hereinafter referred to as "unevenness of brightness") is formed because of a voltage drop caused by a resistance in positive electrode wiring. The characteristics of the unevenness of brightness are as follows: as illustrated in FIG. 8, brightness increases toward the +direction in y coordinate (i.e., toward the top edge 711, which is the side where power is supplied) and decreases toward zero in y coordinate (i.e., toward the bottom edge 721, which is the side where no power is supplied).

Figure 9:
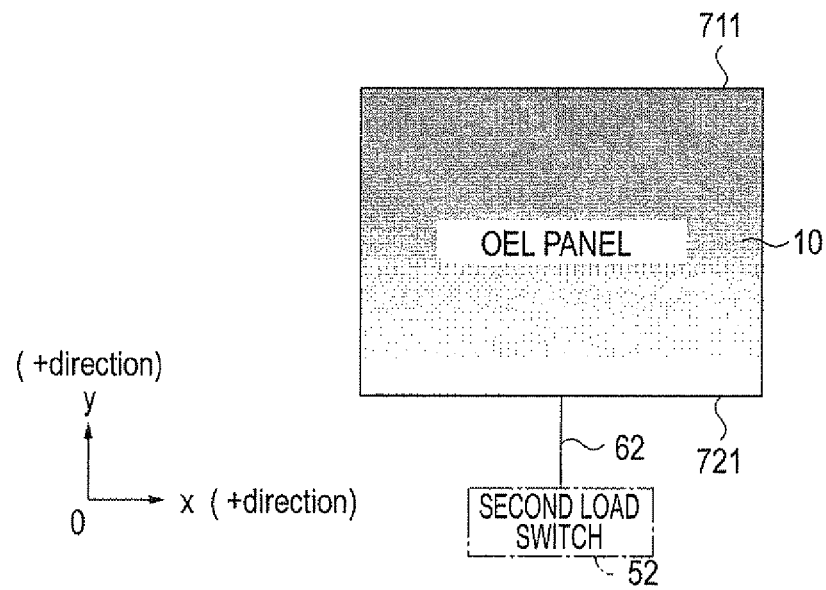
FIG. 9 is a diagram that schematically illustrates an example of power supply from a second load switch according to the third embodiment of the invention.

FIG. 9 is a diagram that schematically illustrates an example of power supply from the second load switch 52 to the bottom edge 721 of the organic EL panel 10.

When power is supplied from the second load switch 52, which is the other part of the power switching unit 50, to the bottom edge 721 of the organic EL panel 10 via the second power line 62, unevenness of brightness occurs because of a voltage drop caused by a resistance in positive electrode wiring. The characteristics of the unevenness of brightness are as follows: as illustrated in FIG. 9, brightness decreases toward the +direction in y coordinate (i.e., toward the top edge 711, which is the side where no power is supplied) and increases toward zero in y coordinate (i.e., toward the bottom edge 721, which is the side where power is supplied).

Even though there is the unevenness of brightness illustrated in FIGS. 8 and 9, when the organic EL panel 10 is driven by the structure illustrated in FIG. 7, the unevenness of brightness is inconspicuous.

The scope of the invention is not limited to the exemplary embodiments described above. The invention may be modified, adapted, changed, improved, etc. in a variety of modes in its actual implementation. Variation examples are explained below.

Variation Example 1

Sinusoidal Wave Driving

Figure 10:
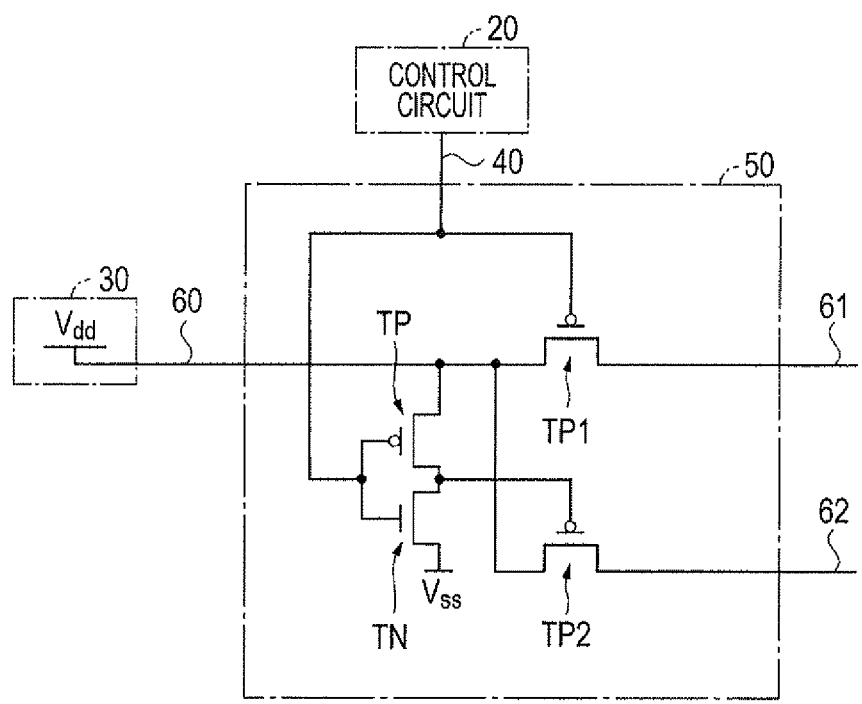
FIG. 10 is a block diagram that schematically illustrates an example of a part of an illumination device according to a first variation example of the invention.
Figure 11:
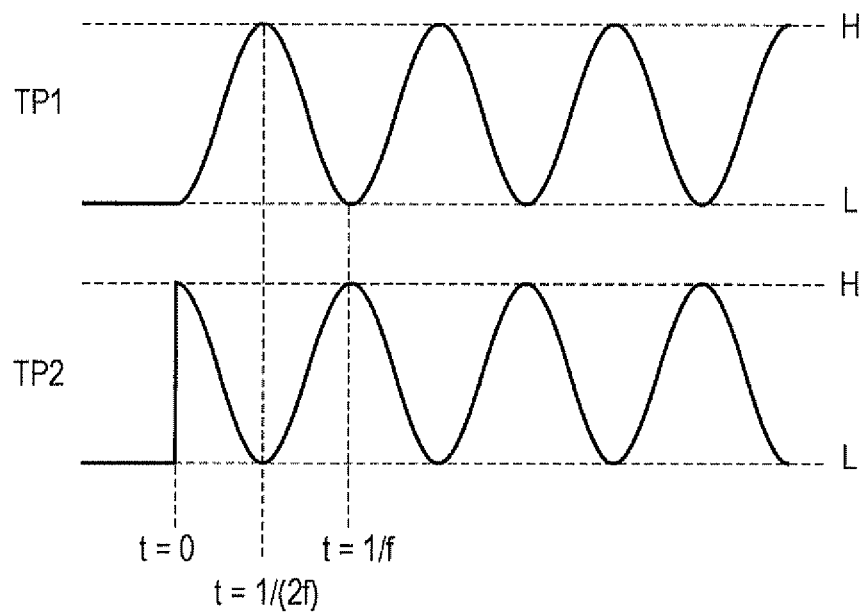
FIG. 11 is a diagram that schematically illustrates a power-supply sinusoidal-wave pattern according to the first variation example of the invention.

FIG. 10 is a block diagram that schematically illustrates an example of a part of an illumination device according to a first variation example of the invention. FIG. 11 is a diagram that schematically illustrates a power-supply sinusoidal-wave pattern according to the first variation example of the invention. An illumination device according to the first variation example of the invention will now be explained. The same reference numerals are assigned to components that are the same as those of the first, second, or third embodiment of the invention. The explanation of these components is not repeated here. A control signal outputted from the control circuit 20 according to the first variation example of the invention (refer to FIG. 10) is different from that of the first embodiment of the invention (refer to FIG. 3). Accordingly, a power-supply pattern according to the first variation example of the invention (refer to FIG. 11) is also different from that of the first embodiment of the invention (refer to FIG. 4). Except for the above differences, the structure of the first variation example of the invention is substantially the same as that of the first embodiment of the invention.

In the first embodiment of the invention, a rectangular wave is supplied to power supply portions for light emission. In contrast, in the first variation example of the invention, a sinusoidal wave (alternating current power) is supplied to power supply portions for light emission. As illustrated in FIG. 10, the power switching unit 50 includes at least one inverter circuit. As in the first embodiment of the invention, the inverter circuit is made up of a p-type transistor TP and an n-type transistor TN. The source of the p-type transistor TP is connected to the positive supply Vdd in the power source 30 via the power line 60. The source of the n-type transistor TN is connected to the negative supply Vss. An alternating current signal is inputted from the control circuit 20 into the power switching unit 50. The AC signal inputted into the power switching unit 50 branches off. The AC signal is inputted into the inverter circuit on one path. The AC signal is inputted into the gate of a first p-type transistor TP1 on the other path. The output terminal of the inverter circuit is connected to the gate of a second p-type transistor TP2. The source of the first p-type transistor TP1 is connected to the positive supply Vdd. The drain of the first p-type transistor TP1 is connected to the first power line 61. The source of the second p-type transistor TP2 is connected to the positive supply Vdd. The drain of the second p-type transistor TP2 is connected to the second power line 62.

Since the illumination device has the circuit structure described above, the phase of the drain conductance of the first p-type transistor TP1 is shifted from the phase of the drain conductance of the second p-type transistor TP2 by π (180°). Because of the phase shift, the signal has the pattern illustrated in FIG. 11. That is, when the first-side (71) side is in a bright light-emission state, the second-side (72) side is in a dark light-emission state. When the first-side (71) side is in a dark light-emission state, the second-side (72) side is in a bright light-emission state. The sum of the drain conductance of the first p-type transistor TP1 and the drain conductance of the second p-type transistor TP2 is always high conductance H. For this reason, the brightness of the illumination device as a whole is kept at a constant level. In rectangular-wave driving, there is a slight possibility of the occurrence of a non-emission time period because of a timing error. The first variation example of the invention eliminates such a possibility. Thus, the illumination device always emits light that is free from non-emission discontinuity and can give a user a sense of uniform emission.

In general, when the number of power supply portions is k (where k is an integer greater than or equal to two), the conductance of switches that are connected respectively to the power supply portions is shifted in phase by 2π/k each; amplitude is set at 1/k of that of one switch. Specifically, the conductance $C_{1i}$ of the i-th (where i is an integer from 1 to k) switch is expressed by the formula (1).

$$C_{1i} = \frac{C_0}{k} \cdot \left\{ \sin\left[2\pi\left(\phi_0 + \frac{i}{k} + ft\right)\right] + 1 \right\} \quad (1)$$

In the above formula (1), $C_0$ denotes the amplitude of the conductance of one switch; $\phi_0$ denotes an arbitrary phase adjustment value; f denotes a frequency, which should preferably be an integer multiple of 60 Hz; t denotes time. FIG. 11 shows a waveform obtained by substituting the following values into the above formula (1): k=2; $\phi_0$=¼; i=1 for TP1; i=2 for TP2. The sum of the conductance $C_{1i}$ of the switches is always $C_0$ as illustrated in the formula (2).

$$\sum_{i=1}^{k} C_{1i} = C_0 \quad (2)$$

Thus, the brightness of the illumination device 1 is always constant in terms of time.

As described above, the illumination device 1 according to the first variation example of the invention can offer soft and uniform illumination with smooth switchover between power supply portions, in addition to producing the effects of the first, second, and third embodiments of the invention.

Variation Example 2

Two-Sided Light Emission or Curved-Surface Light Emission

Figure 12:
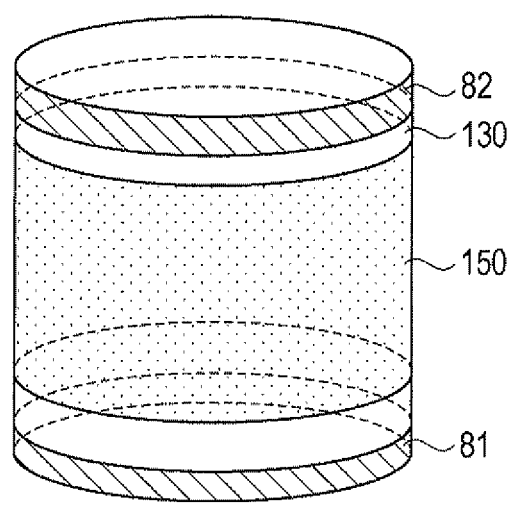
FIG. 12 is a perspective view that schematically illustrates the appearance of a part of an illumination device according to a second variation example of the invention.

FIG. 12 is a perspective view that schematically illustrates the appearance of a part of an illumination device according to a second variation example of the invention. An illumination device according to the second variation example of the invention will now be explained. The same reference numerals are assigned to components that are the same as those of the first, second, or third embodiment of the invention. The explanation of these components is not repeated here. The difference between the second variation example of the invention (refer to FIG. 12) and the first embodiment of the invention (refer to FIG. 2) lies in the appearance of an illumination device and the mode/manner of light emission. Except for the above difference, the structure of the second variation example of the invention is substantially the same as that of the first embodiment of the invention.

The organic EL panel 10 according to the first embodiment of the invention is a flat panel. However, the shape of the organic EL panel 10 is not limited thereto. It may have a curved surface. To form a curved surface, a substrate that has flexibility is used for each of the first substrate 110 and the second substrate 120. For example, a plastic film made of polyethylene terephthalate (PET) or the like is used for each of these two substrates.

In the first embodiment of the invention, light goes out from the first-substrate (110) side of the organic EL panel 10. The foregoing structure may be modified to take out light from both the first-substrate (110) side and the second-substrate (120) side. In such a modified structure, the second electrode 140 is also a transparent conductive film. For example, if the second electrode 140 is formed as a layer of aluminum with a thickness of approximately 10 nm, the transmission factor of the second electrode 140 at the area of visible light is approximately 20%. With such a structure, it is possible to take out light emitted from the light emission layer 150 from the second-substrate (120) side, too. In the structure illustrated in FIG. 12, a PET film is used for the first substrate 110. A PET film is used for the second substrate 120, too. The illumination device 1 has a cylindrical shape. The first substrate 110 is provided outside the cylinder. The second substrate 120 is provided inside the cylinder. Light is taken out from both the outside and the inside thereof. The first electrode 130 is an ITO film having a thickness of 100 nm. The second electrode 140 is an aluminum film having a thickness of 10 nm. The illumination device 1 has a curved shape and emits light from both sides.

As described above, an illumination device according to the second variation example of the invention offers flexibility in its shape and is capable of emitting light from both sides, in addition to producing the effects of the first, second, and third embodiments of the invention.

This application claims priority from Japanese Patent Applications No. 2010-237160 filed in the Japanese Patent Office on Oct. 22, 2010, and No. 2011-134862 filed in the Japanese Patent Office on Jun. 17, 2011, the entire disclosure of which is hereby incorporated by reference in its entirely.

What is claimed is:

1. An illumination device comprising:
a first electrode;
a second electrode;
a light emission layer that is provided between the first electrode and the second electrode;
a power source;
a power switcher;
a control circuit; and
a plurality of power supply portions that is connected to the first electrode,
wherein the control circuit controls the power switcher in such a way that, when a first power supply portion of the plurality of power supply portions is connected to the power source, a second power supply portion is not connected to the power source, and
wherein the plurality of power supply portions includes the first power supply portion and the second power supply portion; the first power supply portion is provided along a first side of the first electrode; the second power supply portion is provided along a second side of the first electrode; and the first power supply portion and the second power supply portion get connected to the power source alternately.

2. The illumination device according to claim 1, wherein the power switcher includes a plurality of switches that is connected to the plurality of power supply portions.

3. The illumination device according to claim 2, wherein the control circuit puts the plurality of switches into an ON state selectively.

4. The illumination device according to claim 1, wherein the power switcher includes an inverter circuit.

5. The illumination device according to claim 1, wherein the first electrode has a polygonal shape; and the first side and the second side are located opposite to each other.

6. An illumination device comprising:
a first electrode;
a second electrode;
a light emission layer that is provided between the first electrode and the second electrode;
a first switch that is connected to a first side of the first electrode;
a second switch that is connected to a second side of the first electrode, the second side being located opposite to the first side;
a power source;
a plurality of power supply portions that is connected to the first electrode; and
a control circuit that is connected to the first switch and the second switch and carries out control to put the first switch and the second switch into an ON state alternately,
wherein the plurality of power supply portions includes a first power supply portion and a second power supply portion; the first power supply portion is provided along the first side of the first electrode; the second power supply portion is provided along the second side of the first electrode; and the first power supply portion and the second power supply portion get connected to the power source alternately by the first switch and the second switch.

7. The illumination device according to claim 1, wherein a switching frequency of the first and second switches is approximately 60 Hz.

\* \* \* \* \*